United States Patent
Calfee et al.

(10) Patent No.: US 11,942,123 B1
(45) Date of Patent: Mar. 26, 2024

(54) MEASURING VCM RADIAL LOCATION USING FLEX CIRCUIT SHAPE DURING SPIRAL WRITE

(71) Applicants: Kabushiki Kaisha Toshiba, Tokyo (JP); Toshiba Electronic Devices & Storage Corporation, Tokyo (JP)

(72) Inventors: Gary W. Calfee, Santa Clara, CA (US); Rodney Ngai, Sunnyvale, CA (US); Gabor Szita, Mountain View, CA (US)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 18/177,051

(22) Filed: Mar. 1, 2023

(51) Int. Cl.
*G11B 5/596* (2006.01)

(52) U.S. Cl.
CPC .............................. *G11B 5/59688* (2013.01)

(58) Field of Classification Search
None
See application file for complete search history.

(56) References Cited

U.S. PATENT DOCUMENTS

| | | | | |
|---|---|---|---|---|
| 4,875,116 A * | 10/1989 | Yasuda | ............. | G11B 5/5547 360/77.03 |
| 5,381,288 A * | 1/1995 | Karam, II | ............ | G11B 5/4826 |
| 5,526,208 A * | 6/1996 | Hatch | ................. | G11B 5/4846 360/99.19 |
| 5,541,784 A * | 7/1996 | Cribbs | ............... | G11B 5/59633 360/77.06 |
| 5,862,015 A * | 1/1999 | Evans | ................. | G11B 5/4833 360/77.03 |
| 2008/0204913 A1* | 8/2008 | Umezaki | ................ | G11B 27/36 360/31 |
| 2008/0247078 A1* | 10/2008 | Yao | ...................... | G11B 5/6058 |
| 2013/0314817 A1* | 11/2013 | Otsuki | ................. | G11B 5/5552 360/86 |

* cited by examiner

Primary Examiner — Fred Tzeng
(74) *Attorney, Agent, or Firm* — Kim & Stewart LLP

(57) ABSTRACT

In a disk drive that includes a magnetic head and a flexible printed circuit board (FPCB) coupled to an actuator for the magnetic head, a method of writing servo information includes: receiving a signal based on an electrical property of a material included in the FPCB, wherein the electrical property of the material changes as the actuator moves; determining a radial position of the magnetic head relative to a disk of the disk drive based on the signal; and controlling a radial velocity of the magnetic head relative to the disk of the disk drive based on the radial position.

20 Claims, 9 Drawing Sheets

700

| Electrical Resistance Entries 701 | Radial Position Entries 702 |
|---|---|
| 102 | 60,290 |
| 105 | 60,310 |
| 108 | 60,329 |
| 111 | 60,348 |
| 115 | 60,366 |
| 118 | 60,384 |
| 122 | 60,401 |
| 125 | 60,417 |
| ... | ... |

FIG. 7

MEASURING VCM RADIAL LOCATION USING FLEX CIRCUIT SHAPE DURING SPIRAL WRITE

BACKGROUND

In a typical hard disk drive (HDD), servo sectors on the disk are used to provide position information about the location of a magnetic head over a disk surface. A common approach for writing such servo information on one or more disk surfaces in an HDD is referred to as spiral-based servo self-write, or spiral-based SSW. According to this approach, multiple spiral-shaped servo information patterns (or "servo spirals") are written on at least one disk surface prior to the SSW process. During the SSW process, a magnetic head of the HDD is positioned relative to a disk surface based on timing and position information in the servo spirals, so that the final servo information (the servo sectors) can be written on the disk surface by the magnetic head. In this way, the HDD itself writes the servo sectors on each disk surface.

For an error-free and robust SSW process, the servo spirals used should be precisely written on the disk surface with a predetermined and constant slope. Such servo spirals may be written on the disk surface with an external media writer before assembly of the disk drive, or with a servo writing machine that uses an external precision actuator to position the disk drive actuator with a mechanical push pin through an opening in the disk drive housing. In either case, setup and use of such external equipment for each individual HDD is time-consuming and expensive in the context of high-volume manufacturing.

In light of this, in-drive spiral-writing schemes have been employed, in which an HDD itself writes servo spirals prior to performing the SSW process. For example, a set of coarsely positioned spirals may be written by the HDD while the actuator is moved across a disk surface by applying a suitable open-loop voltage profile, or by using velocity control that is based on back electromotive force (back-EMF) feedback. More precisely positioned sets of spirals can then be written in one or more subsequent closed-loop spiral-writing processes, by demodulating signals from the more coarsely positioned sets of spirals. For example, a set of coarse servos spirals, a set of fine servo spirals, and a set of final servos spirals may be progressively written by the HDD itself in this way. The servo sectors are then written on a disk surface by positioning the magnetic head based on the final, most accurately positioned, set of servo spirals in a spiral-based SSW process.

In-drive methods for writing an initial set of coarsely positioned spirals can have significant velocity variation while individual spirals are written. As a result, differences in spiral-to-spiral spacing are common, particularly in the initial set of spirals written in an HDD. In fact, neighboring spirals written by in-drive spiral writing methods can be located so closely to each other that, during subsequent demodulation of the servo spirals, the servo interrupt service routine for demodulating the spirals may not have sufficient time, after processing data for the first spiral, to process data for the second spiral, thereby skipping the timing and position information provided by the second spiral. In addition, neighboring spirals may cross, so that during demodulation a subsequent spiral may be read before an antecedent spiral. In either case, such loss or scrambling of servo information can result in loss of synchronization between firmware spiral numbers and spiral data tables storing data for each of the spirals written on the disk surface. Such issues during servo spiral demodulation can require rework of an HDD, which is time-consuming, or scrapping of an HDD, which is costly and inefficient.

In light of the above, there is a need in the art for improving the reliability of the spiral-based SSW process.

SUMMARY

One or more embodiments provide systems and methods for determining the radial position of a magnetic head during an SSW process in an HDD. In the embodiments, as the magnetic head is moved radially across a disk surface and writes a servo spiral, an amount of deformation is measured of a flexible printed circuit board (FPCB) that connects an actuator of the HDD to a printed circuit board (PCB) of the HDD. Based on the measured deformation, an estimate of the specific radial position of the magnetic head is determined. In some embodiments, the deformation of the FPCB is measured with a strain gauge included in or coupled to a surface of the FPCB. In other embodiments, the deformation of the FPCB is measured by a capacitance of two bodies included in or coupled to the FPCB. In either case, the specific radial position that is determined in this way can be employed as an absolute radial position of the magnetic head during SSW or as an additional input for determining the current radial position of the magnetic head during SSW.

According to an embodiment, in a disk drive that includes a magnetic head and a flexible printed circuit board (FPCB) coupled to an actuator for the magnetic head, a method of writing servo information includes: receiving a signal based on an electrical property of a material included in the FPCB, wherein the electrical property of the material changes as the actuator moves; determining a radial position of the magnetic head relative to a disk of the disk drive based on the signal; and controlling a radial velocity of the magnetic head relative to the disk of the disk drive based on the radial position.

A disk drive, according to an embodiment, includes: a magnetic head; an actuator for the magnetic head; a flexible printed circuit board (FPCB) coupled to the actuator; and a controller. The controller is configured to perform the steps of: receiving a signal based on an electrical property of a material included in the FPCB, wherein the electrical property of the material changes as the actuator moves; determining a radial position of the magnetic head relative to a disk of the disk drive based on the signal; and controlling a radial velocity of the magnetic head relative to the disk of the disk drive based on the radial position.

BRIEF DESCRIPTION OF THE DRAWINGS

So that the manner in which the above recited features of embodiments can be understood in detail, a more particular description of embodiments, briefly summarized above, may be had by reference to the appended drawings. It is to be noted, however, that the appended drawings illustrate only typical embodiments and are therefore not to be considered limiting of its scope, for the invention may admit to other equally effective embodiments.

FIG. 7 schematically illustrates a radial position lookup table, according to an embodiment.

For clarity, identical reference numbers have been used, where applicable, to designate identical elements that are common between figures. It is contemplated that features of one embodiment may be incorporated in other embodiments without further recitation.

DETAILED DESCRIPTION

System Overview

Figure 1:
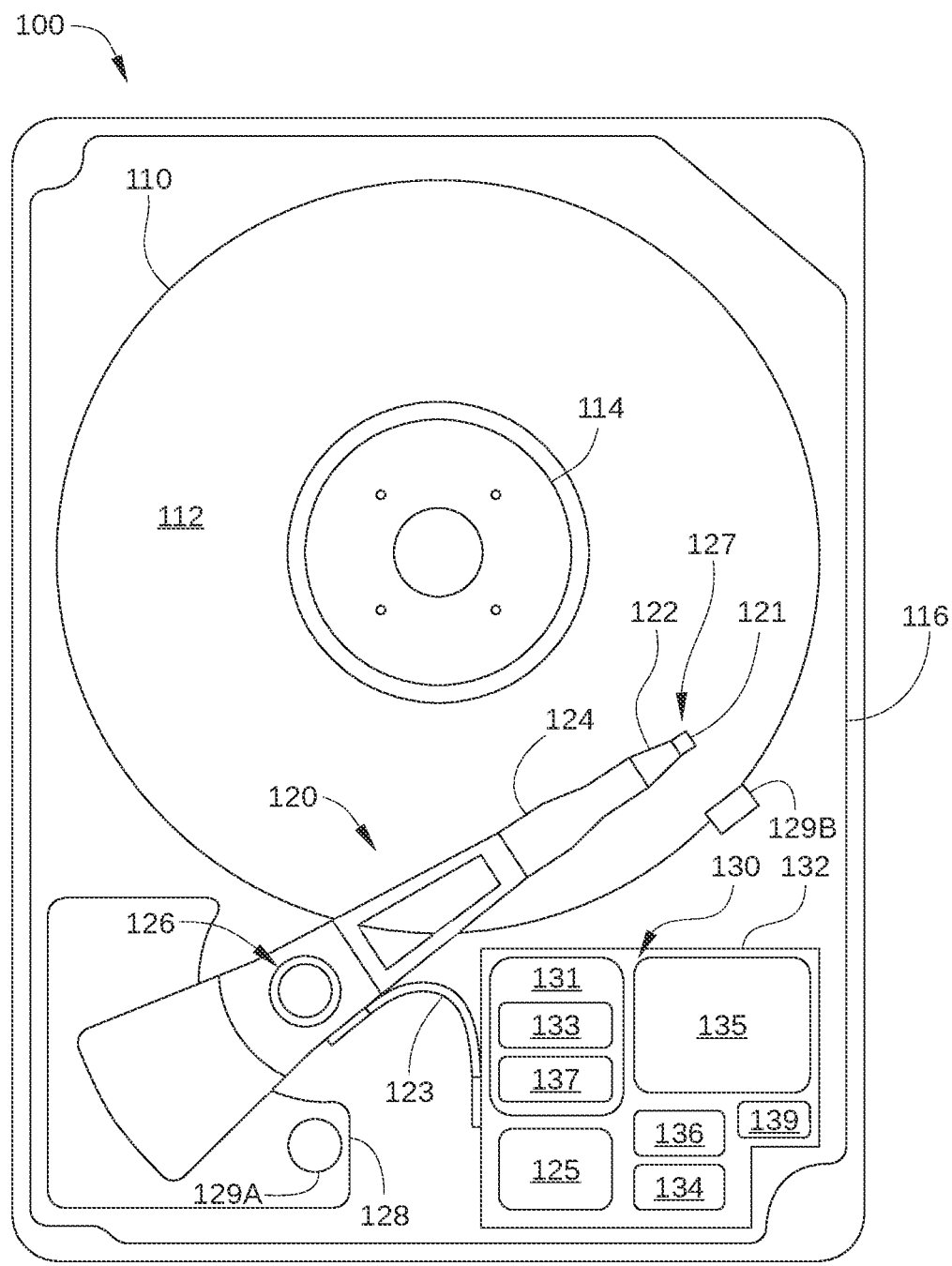
FIG. 1 is a schematic view of an exemplary hard disk drive, according to one embodiment.

FIG. 1 is a schematic view of an exemplary hard disk drive (HDD) 100, according to one embodiment. For clarity, HDD 100 is illustrated without a top cover. HDD 100 can include multiple storage disks 110 (only one of which is visible in FIG. 1) that each include one or two recording surfaces 112 on which a plurality of concentric data storage tracks are disposed. Storage disks 110 are coupled to and rotated by a spindle motor 114 that is mounted on a base plate 116. An actuator arm assembly 120 is also mounted on base plate 116, and includes one or more sliders 121 (only one of which is visible in FIG. 1). Each slider 121 is mounted on a flexure arm 122 with a magnetic read/write head 127 that reads data from and writes data to the data storage tracks of an associated recording surface 112. Each flexure arm 122 is attached to an actuator arm 124 that is rotated about a bearing assembly 126 by a voice coil motor 128. Thus, voice coil motor 128 moves all of the one or more sliders 121 radially relative to a respective recording surface 112 of a respective storage disk 110, thereby positioning a read/write head 127 over a desired concentric data storage track.

In some embodiments, each read/write head 127 has an associated additional actuator. The additional actuator (not shown in FIG. 1) for each read/write head 127 is mechanically coupled to the actuator arm 124 that corresponds to that read/write head 127. In such embodiments, voice coil motor 128 is the prime mover and each microactuator is a second-stage actuator for an associated read/write head 127. In such embodiments, each microactuator can be mounted on a respective flexure arm 122, at a gimbal between the respective flexure arm 122 and the corresponding slider 121, or on the corresponding slider 121 itself. Each microactuator typically includes one or more piezoelectric elements and is configured to move a corresponding read/write head 127 radially a small distance, for example on the order of a few tens of nanometers.

Spindle motor 114, voice coil motor 128, read/write head 127, and associated microactuators are communicatively coupled to electronic circuits 130, which are mounted on a printed circuit board 132. Generally, voice coil motor 128, read/write head 127, and associated microactuators are communicatively coupled to electronic circuits 130 via a flexible printed circuit board (FPCB) 123. According to various embodiments, FPCB 123 is configured to generate a signal that is based on an electrical characteristic of a material included in the FPCB 123 and indicates a deflection of FPCB 123. For example, in some embodiments, a flexure monitoring circuit 139 is included in electronic circuits 130 of HDD 100. Flexure monitoring circuit 139 is described in greater detail below in conjunction with FIG. 4. Various embodiments of FPCB 123 are described below in conjunction with FIGS. 5, 6A, 6B, 8A, and 8B.

In the embodiment illustrated in FIG. 1, a single actuator arm assembly 120 is shown that includes only one slider 121, one flexure arm 122, one actuator arm 124, and one read/write head 127. In other embodiments, actuator arm assembly 120 includes a plurality of actuator arms 124, sliders 121, flexure arms 122, and read/write heads 127, where each read/write head 127 is associated with a different recording surface 112 of HDD 100. Further, in some embodiments, HDD 100 can include multiple actuator arm assemblies 120 that are each rotated about bearing assembly 126 by a respective VCM 128 independently from each other. In such embodiments, each actuator arm assembly 120 may each include a plurality of actuator arms 124, sliders 121, flexure arms 122, and read/write heads 127, as well as a dedicated FPCB 123.

Electronic circuits 130 include a read/write channel 137, a microprocessor-based controller 133, random-access memory (RAM) 134 (which may be a dynamic RAM and used as one or more data buffers) and/or a flash memory device 135, and, in some embodiments, a flash manager device 136. In some embodiments, read/write channel 137, microprocessor-based controller 133, and/or flash manager device 136 are included in a single chip, such as a system-on-chip 131. In some embodiments, HDD 100 further includes a motor-driver chip 125 that accepts commands from microprocessor-based controller 133 and drives both spindle motor 114 and voice coil motor 128.

When data are transferred to or from a particular storage disk 110 of HDD 100, actuator arm assembly 120 moves in an arc between the inner diameter (ID) and the outer diameter (OD) of a particular storage disk 110. For example, in some embodiments, the arc of motion of actuator arm assembly 120 extends from a point near the ID of storage disk 110 (for example when actuator arm assembly 120 contacts a crash stop 129A) to a point near the OD of storage disk 110 (for example when actuator arm assembly 120 contacts a ramp 129B, an OD crash stop, or other structure disposed proximate the OD of storage disk 110). Actuator arm assembly 120 accelerates in one angular direction when current is passed in one direction through the voice coil of voice coil motor 128 and accelerates in an opposite direction when such current is reversed, thereby allowing control of the position of actuator arm assembly 120 and the attached read/write head 127 with respect to the particular storage disk 110. Voice coil motor 128 is coupled with a servo system that uses the positioning data read from servo wedges on storage disk 110 by read/write head 127 to determine the position of read/write head 127 over a specific data storage track. For example, the servo system may position read/write head 127 over recording surface 112 based on positioning data read from recording surface 112.

In positioning a read/write head 127 over a recording surface 112, the servo system determines an appropriate current to drive through the voice coil of voice coil motor 128, and drives said current using a current driver and associated circuitry. In normal operation, the appropriate current is determined based in part on a position feedback signal of the read/write head 127, such as a position error signal (PES). The PES is typically generated by using servo patterns included in servo wedges (not shown) on the recording surface 112 as a reference. One embodiment of a recording surface 112 is illustrated in FIG. 2.

Figure 2:
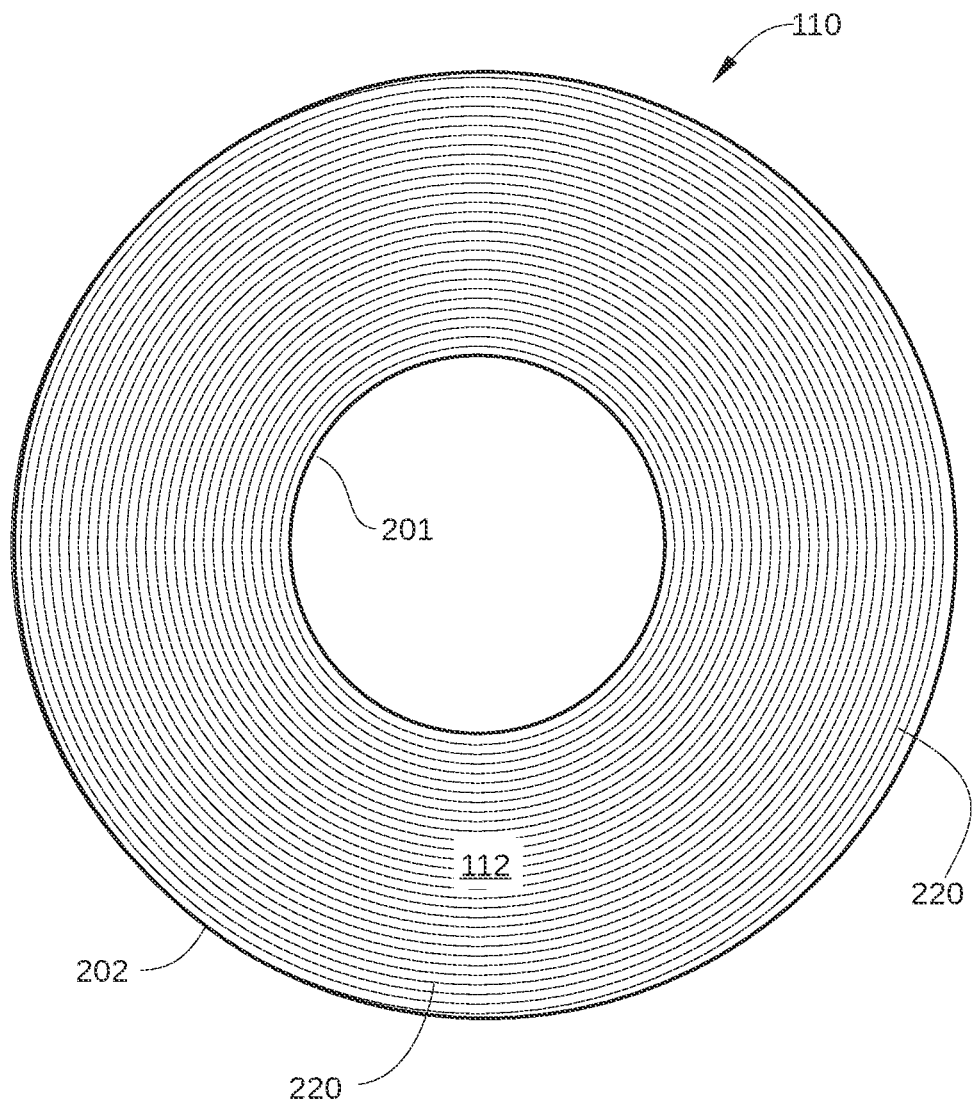
FIG. 2 schematically illustrates one of the recording surfaces of a storage disk with concentric data storage tracks formed thereon, according to an embodiment.

FIG. 2 schematically illustrates a recording surface 112 of a storage disk 110 with concentric data storage tracks 220 formed thereon, according to an embodiment. Data storage tracks 220 are formed on recording surface 112 between an ID 201 and an OD 202 of storage disk 110. Data storage tracks 220 are configured for storing data, and the radial position and track pitch, i.e., spacing, of data storage tracks 220 is defined by servo sectors (not shown) formed on recording surface 112. Each servo sector contains a reference signal that is read by read/write head 127 during read and write operations to position read/write head 127 above a desired data storage track 220. Typically, the actual number of data storage tracks 220 included on recording surface 112 is considerably larger than illustrated in FIG. 2. For example, recording surface 112 may include hundreds of thousands of concentric data storage tracks 220.

In order for HDD 100 to perform servo self-write (SSW) and write the above-described servo wedges on storage disk 110 with the necessary precision for proper operation of HDD 100, position and timing information are provided to the disk drive servo system of HDD 100. The position and timing information that enable the internal servo system of HDD 100 to SSW is typically in the form of reference spiral tracks or "servo spirals" written on storage disk 110. One embodiment of such servo spirals is illustrated in FIG. 3.

Figure 3:
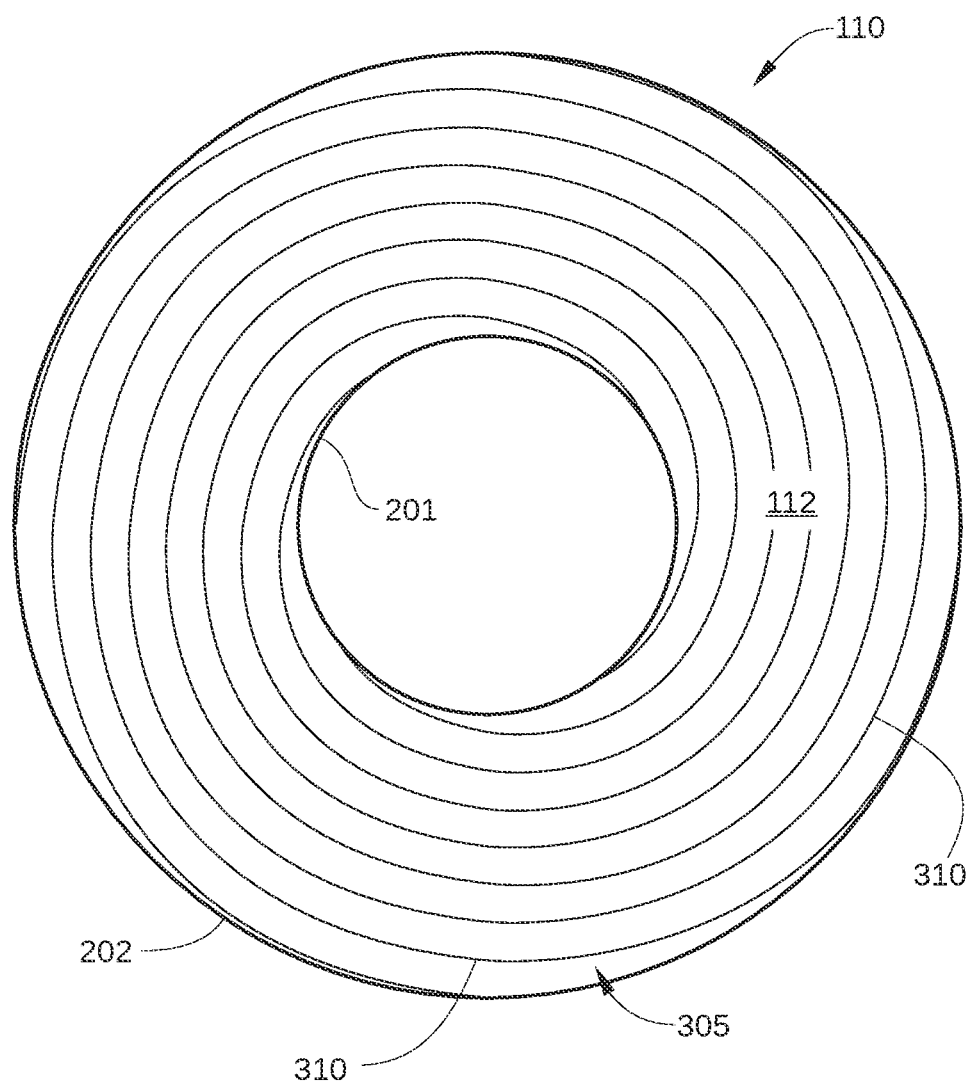
FIG. 3 illustrates a storage disk prior to undergoing a servo self-write process, according to one embodiment.

FIG. 3 illustrates storage disk 110 prior to undergoing an SSW process, according to one embodiment. As shown, storage disk 110 has a spiral set 305 written thereon that includes a plurality of reference spirals 310 that are each circumferentially spaced from adjacent reference spirals 310. It is noted that the number of reference spirals 310 in spiral set 305 is generally larger than that shown in FIG. 3, for example as few as ten or twenty, or as many as several hundred.

Spiral set 305 may be any set of reference spirals configured to provide timing and position information for the servo system of HDD 100, for example to position a write head while writing another set of reference spirals or servo sectors for data storage tracks 220 (shown in FIG. 2). Thus, in some embodiments, spiral set 305 is a set of coarse, i.e., initial, reference spirals. In such embodiments, spiral set 305 may be written onto a substantially blank recording surface 112 of storage disk 110 without the aid of external equipment using read/write head 127 and the servo system of HDD 100, for example, via a bootstrap spiral-writing process. In such a process, references spirals 310 of spiral set 305 are written by read/write head 127 while actuator arm assembly 120 (shown in FIG. 1) is moved radially across surface 112, for example from ID 201 to OD 202 at a substantially constant radial velocity.

According to various embodiments, radial motion of actuator arm assembly 120 is controlled when writing a spiral set 305 of coarse reference spirals 310 based on a measured deformation of FPCB 123 (shown in FIG. 1). In the embodiments, the measured deformation of FPCB 123 indicates the current radial position relative to recording surface 112 of a magnetic head that is writing spiral set 305. Generally, a radial position of a magnetic head relative to recording surface 112 corresponds to the current rotational position of actuator arm assembly 120. According to various embodiments, control of the radial motion of actuator arm assembly 120 during writing of spiral set 305 is based on the radial position of the magnetic head as indicated by the measured deformation of FPCB 123. Thus, the measured deformation of FPCB 123 is employed as position feedback for control of the radial motion of actuator arm assembly 120 and the magnetic head. In some embodiments, such position feedback for the control of the radial motion of actuator arm assembly 120 is employed in combination with conventional approaches for controlling radial motion of actuator arm assembly 120 when writing a spiral set 305 of coarse reference spirals 310. For example, in some embodiments, such position feedback is employed in conjunction with applying a suitable open loop voltage or current profile to voice coil motor 128 (shown in FIG. 1). Alternatively, in some embodiments, such position feedback is employed in conjunction with using velocity control based on back EMF feedback from voice coil motor 128.

Alternatively, in some embodiments spiral set 305 is a set of fine reference spirals, i.e., reference spirals that are more accurately positioned than coarse reference spirals. In such embodiments, spiral set 305 is written onto surface 112 after surface 112 has another set of the above-described coarse spirals written thereon (not shown for clarity). In such embodiments, reference spirals 310 are typically written onto surface 112 using closed-loop tracking of the previously written coarse reference spirals, and can be used subsequently for writing a more accurately positioned set of servo spirals, such as final reference spirals, that enable the writing of servo sector information on surface 112 by HDD 100 in an SSW process. Thus, reference spirals 310 enable the generation of a set of more accurately positioned reference spirals or the writing of final servo sector information on surface 112 using closed-loop control in the servo system of HDD 100.

Figure 4:
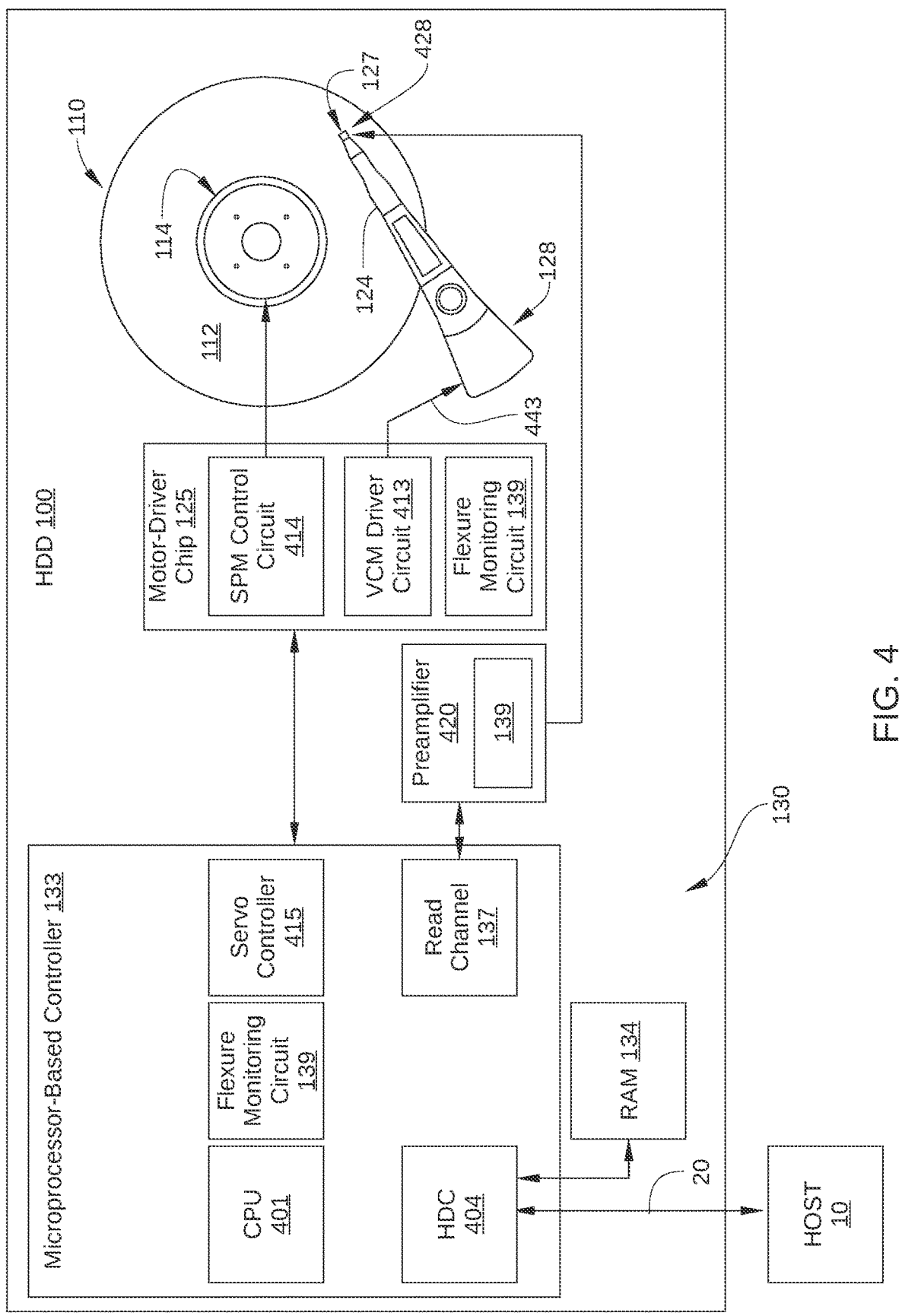
FIG. 4 illustrates an operational diagram of a hard disk drive configured to implement various embodiments.

FIG. 4 illustrates an operational diagram of HDD 100 configured to implement various embodiments. In the embodiment illustrated in FIG. 4, a specific configuration of certain elements of electronic circuits 130 is described. In other embodiments, any other suitable arrangement or configuration of electronic circuits 130 may be employed that is operable to implement one or more embodiments described herein. For example, in some embodiments, various elements of microprocessor-based controller 133 may be configured in a single SoC and/or implemented as stand-alone chips included in electronic circuits 130.

HDD 100 is connected to a host 10, such as a host computer, via a host interface 20, such as a serial advanced technology attachment (SATA) bus or a Serial Attached Small Computer System Interface (SAS) bus. As shown, electronic circuits 130 of HDD 100 include microprocessor-based controller 133 and motor driver chip 125 communicatively coupled to microprocessor-based controller 133.

In the embodiment illustrated in FIG. 4, microprocessor-based controller 133 includes one or more central processing units (CPUs) 401 or other processors, a servo controller 415, a hard disk controller (HDC) 404, and a read/write channel 137.

Motor-driver chip 125 includes a VCM driver circuit 413 and a spindle motor (SPM) control circuit 414. VCM driver circuit 413 generates an amplified control signal 443 in response to control signals (such as VCM commands) from servo controller 415. Control signals 443 enable execution of disk access commands received from host 10 that are to be executed by a servo system of HDD 100 that includes VCM 128. Control signals 443 also enable execution of an SSW process for writing one or more sets off servo spirals, such as reference spirals 310 in FIG. 3.

In the embodiment illustrated in FIG. 4, HDD 100 includes a single RAM 134 that is external to microprocessor-based controller 133. In other embodiments, HDD 100 may include any other suitable configuration of RAM 134, such as a DRAM device integrated in microprocessor-based controller 133.

HDD 100 further includes a preamplifier 420 associated with a read sensor and a write head of read/write head 127. Preamplifier 420 can be mounted on actuator arm assembly 120 or elsewhere within the head and disk assembly (HDA) of HDD 100. Preamplifier 420 amplifies a read signal output from the associated read sensor and transmits the amplified read signal to read/write channel 137. In addition, preamplifier 420 supplies a write signal (e.g., current) to the associated write head in response to write data input from read/write channel 137.

CPU 401 controls HDD 100, for example according to firmware stored in flash memory device 135 or another nonvolatile memory, such as portions of recording surfaces 112. For example, CPU 401 manages various processes performed by HDC 404, read/write channel 137, the read sensor and write head associated with read/write head 127, recording surfaces 112, and/or motor-driver chip 125. Such processes include a writing process for writing data onto recording surfaces 112, a reading process for reading data from recording surfaces 112, various calibration processes, an SSW process, and the like.

In some embodiments, a servo system of HDD 100 (e.g., CPU 401, read/write channel 137, preamplifier 420, servo controller 415, voice-coil motor 128, and a suitable microactuator 428) performs positioning of read/write head 127 included in actuator arm assembly 120 over a corresponding recording surface 112, during which CPU 401 determines an appropriate current to drive through the voice coil of VCM 128. Typically, the appropriate current is determined based in part on a position feedback signal of read/write head 127, such as PES.

Read/write channel 137 is a signal processing circuit that decodes read signals transmitted from preamplifier 420 into read data that are outputted to HDC 404. In addition, read/write channel 137 encodes write data input from HDC 404 and outputs the encoded write data to preamplifier 420. In some embodiments, HDC 404 controls access to RAM 134 by CPU 401 and read/write channel 137, and receives/transmits data from/to host 10. In some embodiments, HDC 404 receives/transmits data from/to host 10 via interface 20.

Flexure monitoring circuit 139 is a signal-processing circuit measuring deformation of FPCB 123 and determining a current radial position a magnetic head relative to recording surface 112 based on the measured deformation of FPCB 123. In some embodiments, flexure monitoring circuit 139 is implemented and incorporated in motor driver chip 125 or preamplifier 420. Alternatively, in some embodiments, flexure monitoring circuit 139 is implemented separately with appropriate amplifier circuitry on printed circuit board 132, for example as one of electronic circuits 130.

In the embodiment illustrated in FIG. 4, various links are shown between certain elements of HDD 100 for enablement of certain embodiments. In some embodiments, additional and/or alternative links between certain elements of HDD 100 may exist for operation of HDD 100, but are not shown for clarity and ease of description. Such additional and/or alternative links would be known to one of ordinary skill in the art.

Measuring Read/Write Head Radial Position Using FPCB Flexure

According to various embodiments, an absolute radial position of read/write head 127 is determined based on a measured deformation of an FPCB that is coupled to actuator arm assembly 120, such as FPCB 123 in FIG. 1. In the embodiments, the FCPB is configured so that a signal based on an electrical characteristic of a material included in the FPCB is generated, where the electrical characteristic of the material varies in response to deformation of the FPCB. Various embodiments of such an FPCB are described below in conjunction with FIGS. 5, 6A, 6B, 8A, and 8B.

Figure 5:
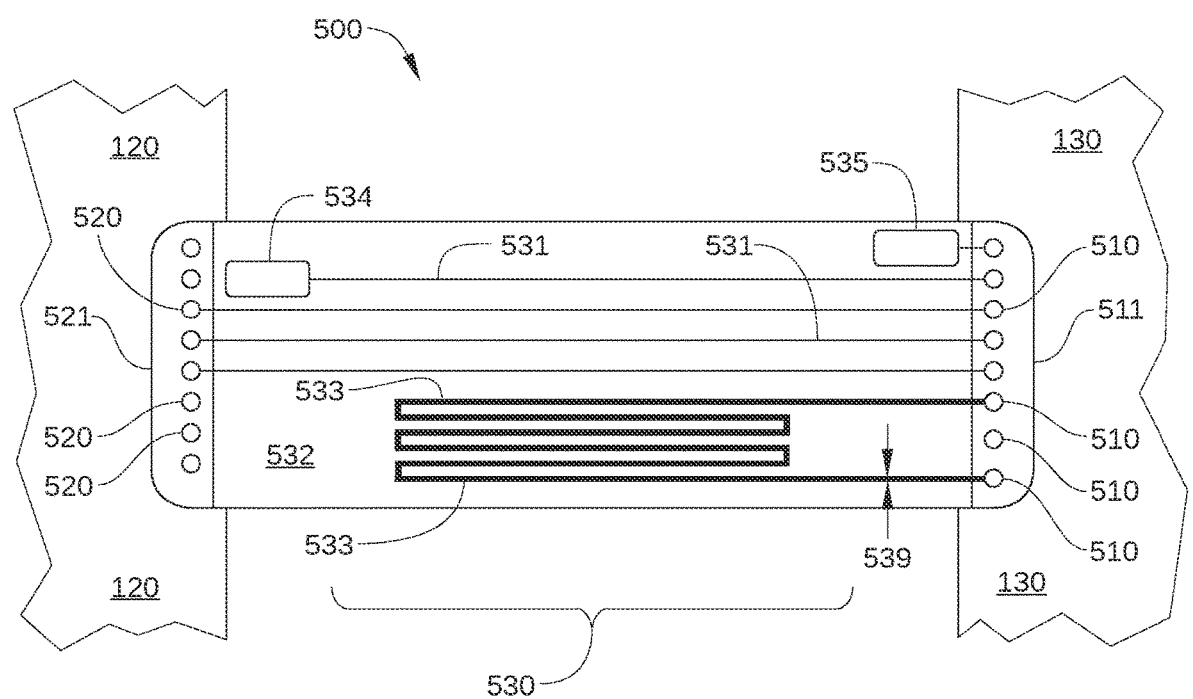
FIG. 5 schematically illustrates a plan view of a flexible printed circuit board (FPCB) of a disk drive connecting an actuator arm assembly and electronic circuits of the disk drive, according to an embodiment.

FIG. 5 schematically illustrates a plan view of an FPCB 500 connecting actuator arm assembly 120 and electronic circuits 130, according to an embodiment. Thus, FPCB 500 can be employed as FPCB 123 of FIG. 1. In some embodiments, FPCB 500 facilitates the transmission of commands and data between one or more electronic circuits 130 of HDD 100 (e.g., microprocessor-based controller 133, read/write channel 137, and/or motor-driver chip 125 in FIG. 1) and electronic components included in actuator arm assembly 120 (e.g., read/write heads 127, sliders 121, dynamic fly-height heaters, and voice coil motor 128 in FIG. 1). For clarity, FPCB 500 is depicted in an unflexed state in FIG. 5, and appears substantially planar.

As shown, FPCB 500 includes a plurality of connections 510 at a first end 511 for electrical connection to electronic circuits 130 and a plurality of connections 520 at a second end 521 for electrical connection to actuator arm assembly 120. In addition, FPCB 500 includes a central portion 530 that is configured to elastically flex as actuator arm assembly changes rotational position relative to a disk of an HDD. Central portion 530 can be formed via conventional techniques well-known in the art for fabricating flexible PCBs, and includes electrical traces 531 for communicatively connecting each connection 510 with a corresponding connection 520, or with strain-gauge members 533, a first conductive body 534, and/or a second conductive body 535.

According to various embodiments, central portion 530 includes one or more strain-gauge members 533 that are formed within and/or on a surface of FPCB 500. For example, in some embodiments, strain-gauge members 533 include metallic traces that undergo a change in cross-section 539 as FPCB 500 flexes in response to movement of actuator arm assembly 120. Thus, strain-gauge members 533 can be employed as a strain gauge that has an electrical resistance that varies depending on how much FPCB 500 is flexed. As such, strain-gauge members 533 are communicatively coupled to one or more connections 510 of FPCB 500, so that a signal based on the electrical resistance of strain-gauge member 533 can be transmitted to electronic circuits 130. In some embodiments, strain-gauge members 533 are formed in a same layer of FPCB 500 as one or more electrical traces 531. Alternatively, in some embodiments, strain-gauge members 533 are formed in a different layer of FPCB 500 than electrical traces 531 and/or on a surface 532 of FPCB 500. Alternatively, in some embodiments, strain-gauge members 533 are included in a strain-gauge device (not shown) that is coupled to a surface of FPCB 500.

Alternatively or additionally, in some embodiments, central portion 530 includes first conductive body 534 and second conductive body 535, which are formed within and/or on a surface of FPCB 500. For example, in some embodiments, first conductive body 534 includes a first metallic plate or other planar body and second conductive body 535 includes a second metallic plate or other planar body. First conductive body 534 and second conductive body 535 can be formed from copper (Cu), aluminum (Al), any suitable alloy thereof, or any other suitable electrically conductive material. As FPCB 500 flexes, a distance separating first conductive body 534 and second conductive body 535 changes. In response, the capacitance of an electrical system that includes first conductive body 534 and second conductive body 535 changes in response to movement of actuator arm assembly 120. Thus, first conductive body 534 and second conductive body 535 can be employed as an electrical system that has an electrical capacitance that varies depending on how much FPCB is flexed. As such, first conductive body 534 and second conductive body 535 are communicatively coupled to one or more connections 510 of FPCB 500, so that a signal based on the electrical capacitance of first conductive body 534 and second conductive body 535 can be transmitted to electronic circuits 130. Alternatively, in some embodiments, first conductive body 534 and second conductive body 535 are included in a capacitive device (not shown) that is coupled to a surface of FPCB 500.

In the embodiment illustrated in FIG. 5, strain-gauge members 533, first conductive body 534, and second conductive body 535 are all communicatively coupled to connections 510. In other embodiments, any other suitable routing of signals from strain-gauge members 533, first conductive body 534, and/or second conductive body 535 can be employed in FPCB 500 to facilitate the measurement of deflection of FPCB 500 during operation.

In the embodiment illustrated in FIG. 5, FPCB 500 is described as a flexible PCB. In other embodiments, FPCB 500 can be configured as a so-called "rigid-flex" PCB that includes a rigid PCB at first end 511 and a second rigid PCB at second end 521. In such embodiments, the rigid PCB at first end 511 facilitates the coupling of connections 510 to electronic circuits 130 and the rigid PCB at second end 521 facilitates the coupling of connections 520 to a surface of actuator arm assembly 120.

Strain Gauge Embodiment

Figure 6A:
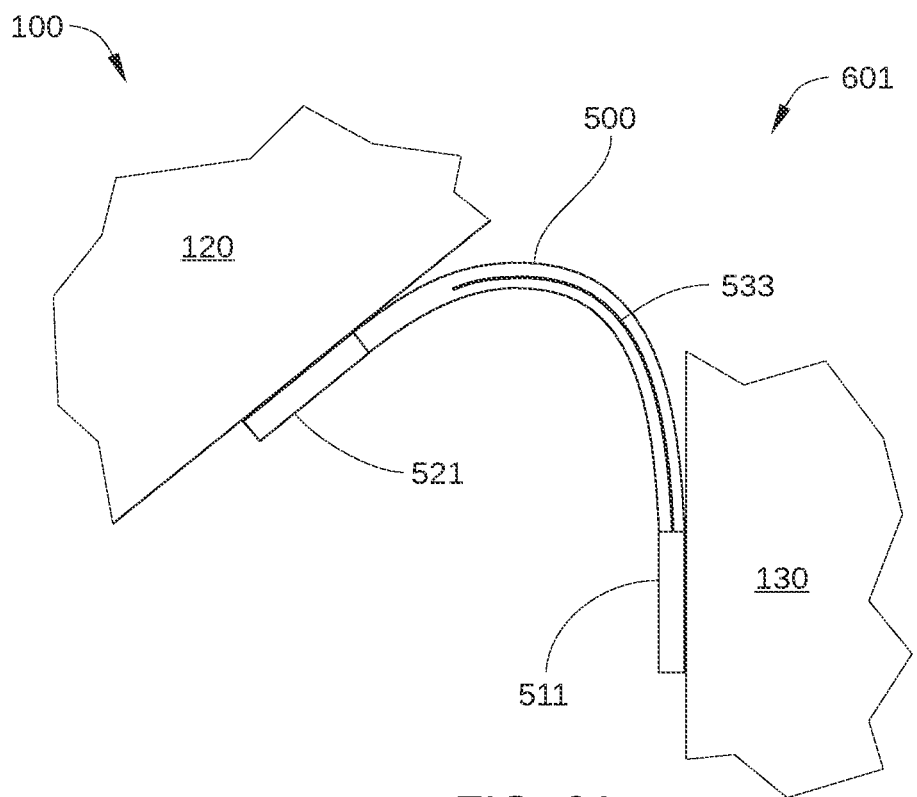
FIG. 6A schematically illustrates an FPCB of a disk drive at a first flex position, according to various embodiments.
Figure 6B:
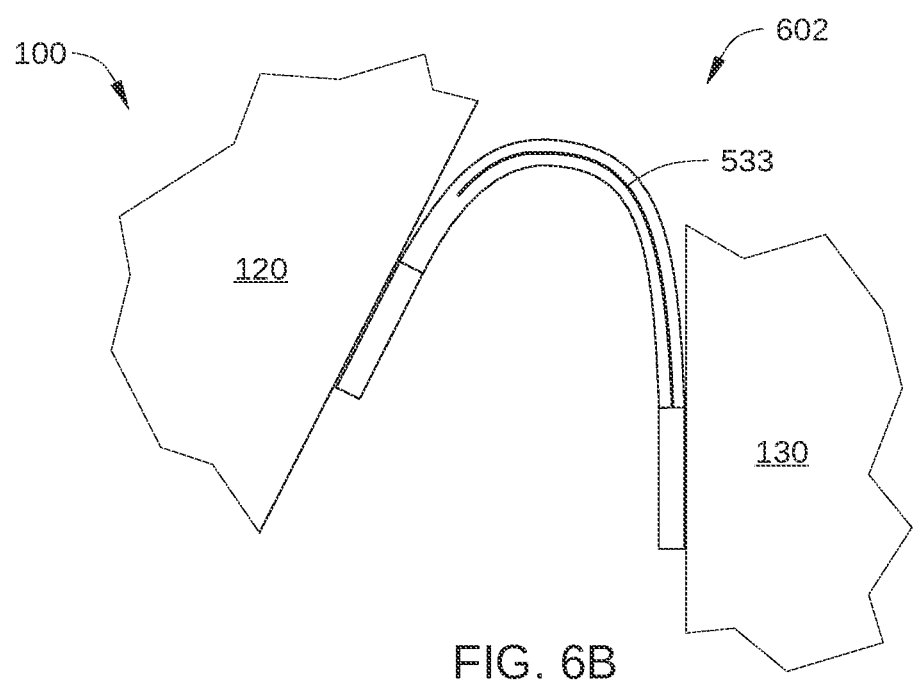
FIG. 6B schematically illustrates an FPCB of a disk drive at a second flex position, according to various embodiments.

FIG. 6A schematically illustrates FPCB 500 at a first flex position 601 and FIG. 6B schematically illustrates FPCB 500 at a second flex position 602, according to various embodiments. As actuator arm assembly 120 rotationally actuates during operation of HDD 100, FPCB 500 is reconfigured to various flex positions, for example from first flex position 601 to second flex position 602. As a result, strain-gauge members 533 undergo bending and a concomitant change in cross-section, thereby changing the electrical resistance of strain-gauge members 533 in a repeatable fashion. Therefore, for each rotational position of actuator arm assembly 120, electrical resistance of strain-gauge members 533 has a different value and, according to various embodiments, measurement of the electrical resistance of strain-gauge members 533 can be employed to determine the radial position of a magnetic head coupled to actuator arm assembly 120.

In some embodiments, circuitry for measurement of the electrical resistance value of strain-gauge members 533 is communicatively coupled to appropriate connections 510 included in FPCB 500. In some embodiments, such circuitry is included in electronic circuits 130, for example as part of motor-driver chip 125, servo controller 415, or CPU 401 (shown in FIG. 4), or a servo-combo chip.

In some embodiments, to determine the current radial position of a read/write head that is coupled to actuator arm assembly 120 relative to a recording surface, HDD 100 employs a lookup table of electrical resistance values and corresponding radial positions of the read/write head. In such embodiments, a measured electrical resistance value for strain-gauge members 533 corresponds to a specific rotational position of actuator arm assembly 120 and therefore indicates a specific radial position of the read/write head. Based on the specific radial position so indicated, the servo system of HDD 100 can then control the radial position of the read/write head based at least in part on the determined radial position. Because each radial position of the read/write head is associated with a different measured electrical resistance value, HDD 100 can determine a radial position of the read/write head based on an electrical resistance value of strain-gauge members 533 and a pre-computed lookup table. One embodiment of such a lookup table is described below in conjunction with FIG. 7.

FIG. 7 schematically illustrates a radial position lookup table 700, according to an embodiment. As shown, radial position lookup table 700 includes a plurality of electrical resistance entries 701 that are each associated with a corresponding radial position entry 702. In some embodiments, electrical resistance entries 701 are values in milliohms or some other measure of electrical resistance, and radial position entries 702 are estimated track numbers or some other measure of absolute radial position on a surface of a recording disk.

According to various embodiments, radial position entries 702 are pre-computed values determined prior to an SSW process. In such embodiments, the radial position of a magnetic head relative to a recording surface of HDD 100 can be determined via radial position lookup table 700. For example, in some embodiments, the radial position of the magnetic head is determined by: measuring an electrical resistance of strain-gauge members 533, determining the electrical resistance entry 701 that most closely approximates the measured electrical resistance, and selecting the radial position entry 702 that corresponds to that electrical resistance entry 701.

According to various embodiments, some or all of radial position entries 702 can be determined based on physical measurements performed on HDD 100 and/or on a disk drive representative of HDD 100. Three example embodiments are described below.

In one example embodiment, servo wedges are written on a recording surface of a disk using a conventional approach, then electrical resistance entries 701 of radial position lookup table 700 are determined by measuring the electrical resistance of strain-gauge members 533 at a plurality of known radial positions. In such an example embodiment, each radial position at which electrical resistance is measured is determined using the conventionally written servo wedges, and radial position lookup table 700 is populated accordingly with electrical resistance entries 701 and radial position entries 702. In some embodiments, the electrical resistance entries 701 and radial position entries 702 are for a representative HDD, and therefore are generic values that are suitable for use by HDDs that have a similar physical configuration to that of the representative HDD.

Alternatively, in another example embodiment, radial position lookup table 700 is generated as described above for a plurality of representative HDDs, and an average radial position lookup table 700 is then generated based on averaging or otherwise combining the electrical resistance entries 701 and radial position entries 702 that are generated for the plurality of representative HDDs.

Alternatively, in yet another example embodiment, radial position lookup table 700 is generated as described above, then is modified for a particular instance of HDD 100 via a calibration procedure performed by the particular instance of HDD 100. For example, in one such embodiment, electrical resistance entries 701 for the particular instance of HDD 100 are modified based on electrical resistance values measured in the calibration process. Examples of electrical resistance values measured in a calibration process include a first electrical resistance of strain-gauge members 533 that is measured when actuator arm assembly 120 is positioned against crash stop 129A and/or a second electrical resistance of strain-gauge members 533 that is measured when actuator arm assembly 120 is positioned against ramp 129B (actuator arm assembly 120, crash stop 129, and ramp 129B are shown in FIG. 1).

In some embodiments, each electrical resistance entry 701 is based on a single measurement of the electrical resistance of strain-gauge members 533 at a specific radial position. In other embodiments, each electrical resistance entry 701 is based on multiple measurements of the electrical of strain-gauge members 533. For example, in some embodiments, each electrical resistance entry 701 is an average of a plurality of electrical resistance measurements performed while actuator arm assembly 120 is at approximately the same position. In such embodiments, the plurality of electrical resistance measurements can be performed over a very short time interval while actuator arm assembly 120 is in motion. Alternatively, in some embodiments, each electrical resistance entry 701 is a running average of a plurality of electrical resistance measurements performed while actuator arm assembly 120 moves through a plurality of radial positions.

Capacitance Embodiment

Figure 8A:
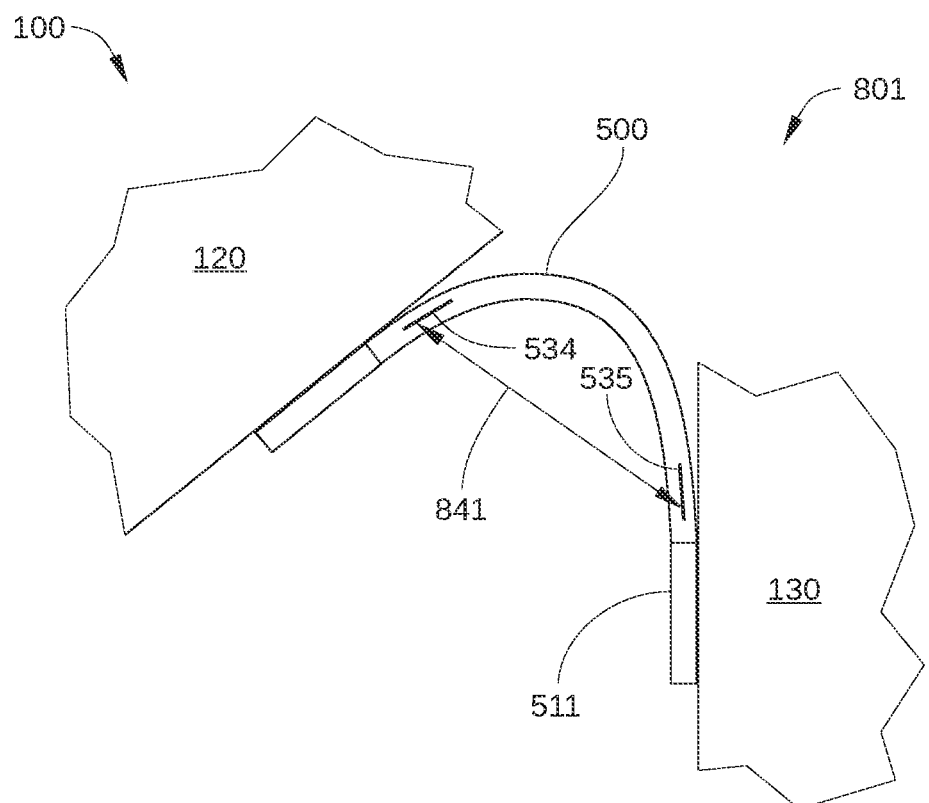
FIG. 8A schematically illustrates an FPCB of a disk drive at a first flex position, according to various embodiments.
Figure 8B:
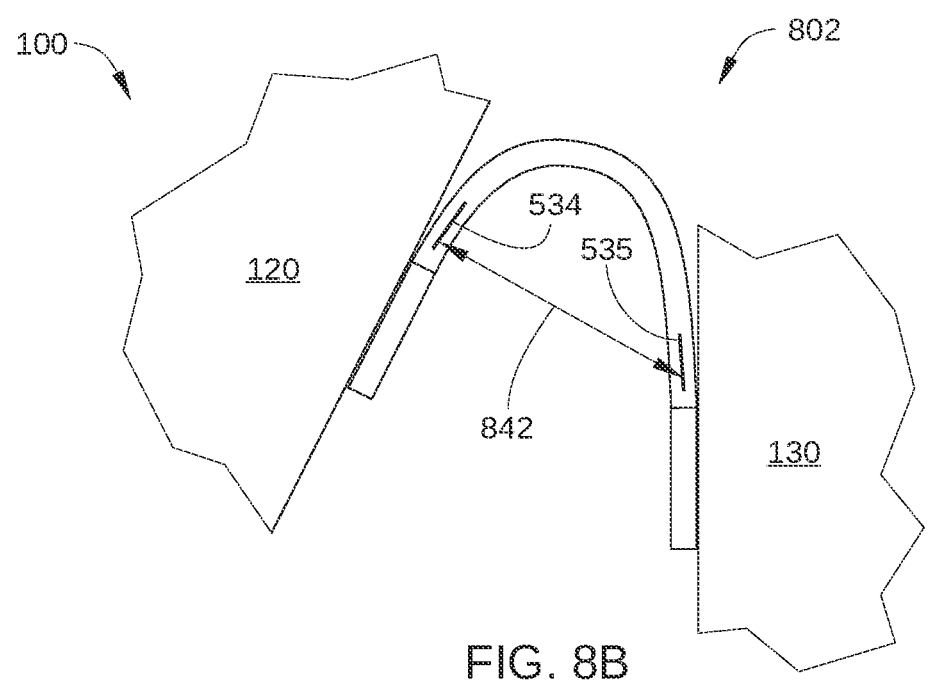
FIG. 8B schematically illustrates an FPCB of a disk drive at a second flex position, according to various embodiments.

FIG. 8A schematically illustrates FPCB 500 at a first flex position 801 and FIG. 8B schematically illustrates FPCB 500 at a second flex position 802, according to various embodiments. As actuator arm assembly 120 rotationally actuates during operation of HDD 100, FPCB 500 is reconfigured to various flex positions, and first conductive body 534 and second conductive body 535 move relative to each other. For example, in first flex position 801, first conductive body 534 and second conductive body 535 are separated by a first distance 841, while in second flex position 802, first conductive body 534 and second conductive body 535 are separated by a second distance 842. As a result, a capacitance of the system that includes first conductive body 534 and second conductive body 535 changes as actuator arm assembly 120 rotationally actuates and deflects FPCB 500 into different flex positions. Therefore, for each rotational position of actuator arm assembly 120, the capacitance of the system that includes first conductive body 534 and second conductive body 535 has a different value and, according to various embodiments, measurement of this capacitance can be employed to determine the radial position of a magnetic head coupled to actuator arm assembly 120.

In some embodiments, circuitry for measurement of the capacitance associated with first conductive body 534 and second conductive body 535 is communicatively coupled to appropriate connections 510 included in FPCB 500. In some embodiments, such circuitry is included in electronic circuits 130, for example as part of motor-driver chip 125, servo controller 415, or CPU 401 (shown in FIG. 4), or a servo-combo chip.

In some embodiments, to determine the current radial position of a read/write head that is coupled to actuator arm assembly 120 relative to a recording surface, HDD 100 employs a lookup table of capacitance values and corresponding radial positions of the read/write head. In such embodiments, a measured capacitance value for first conductive body 534 and second conductive body 535 corresponds to a specific rotational position of actuator arm assembly 120 and therefore indicates a specific radial position of the read/write head. Based on the specific radial position so indicated, the servo system of HDD 100 can then control the radial position of the read/write head based at least in part on the determined radial position. Because each radial position of the read/write head is associated with a different measured capacitance value, HDD 100 can determine a radial position of the read/write head based on a measured capacitance value for first conductive body 534 and second conductive body 535 and a lookup table. In some embodiments, such a lookup table is substantially similar to radial position lookup table 700 of FIG. 7, except that such a lookup table is populated with capacitance values instead of electrical resistance entries 701. In some embodiments, such a lookup table can be generated using techniques similar to those described above for generating radial position lookup table 700.

Servo-Writing Process

Figure 9:
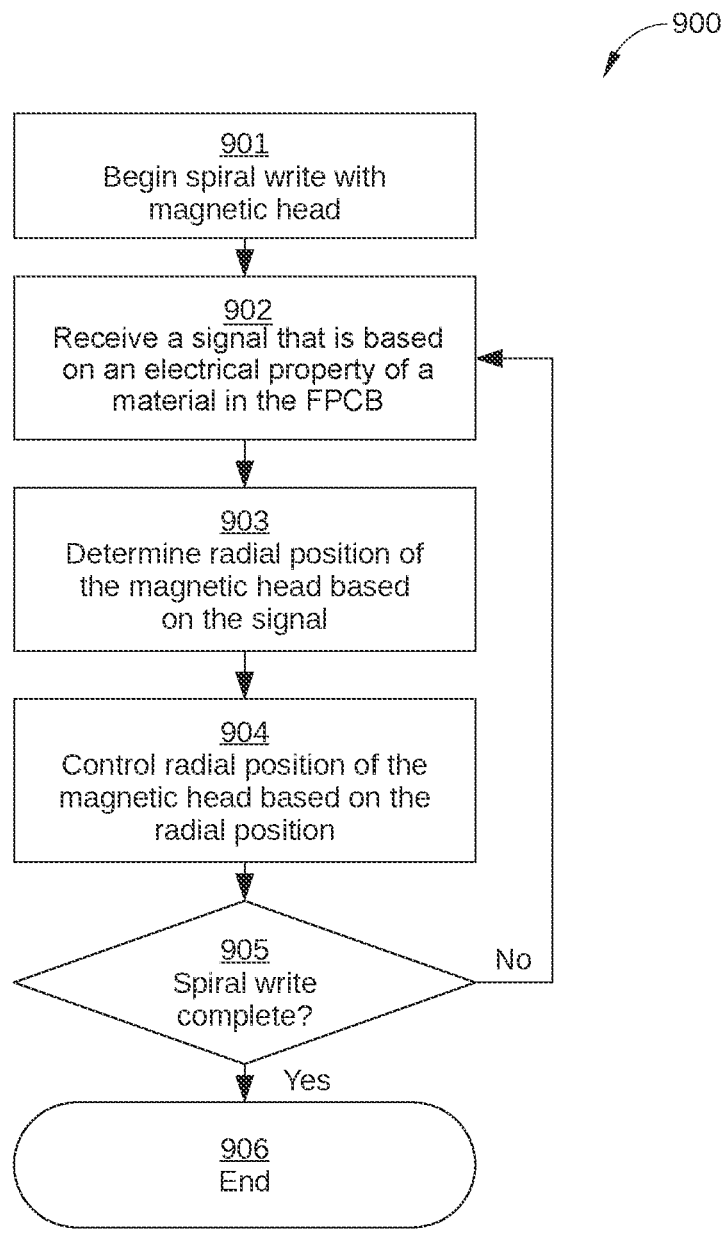
FIG. 9 sets forth a flowchart of method steps for writing servo information in an HDD that includes a magnetic head and an FPCB coupled to an actuator for the magnetic head, according to an embodiment.

FIG. 9 sets forth a flowchart of method steps for writing servo information in an HDD that includes a magnetic head and an FPCB coupled to an actuator for the magnetic head, according to an embodiment. Although the method steps are described in conjunction with HDD 100 in FIGS. 1-8B, persons skilled in the art will understand that the method steps may be performed with other types of systems. The control algorithms for the method steps may reside in microprocessor-based controller 133, some other controller associated with HDD 100, servo controller 315, or a combination thereof. The control algorithms can be implemented in whole or in part as software- or firmware-implemented logic, and/or as hardware-implemented logic circuits.

Prior to the method steps, a radial position lookup table is generated for HDD 100 and received by HDD 100. As described above, in some embodiments, the radial position lookup table may include generic entries that can be employed by a plurality of similarly configured instances of HDD 100. Alternatively, in some embodiments, the radial position lookup table may be a drive-specific table that includes entries generated as part of a calibration process for a particular instance of HDD 100, where the calibration process is performed by that particular instance of HDD 100.

As shown, a method 900 begins at step 901, when a suitable controller (microprocessor-based controller 133, servo controller 315, or some other controller associated with HDD 100) begins a spiral write process on a recording surface 112 via a read/write head 127 associated with the recording surface 112. For example, in some embodiments, the controller moves the read/write head 127 to ID 201 or to OD 202 of a storage disk that includes the recording surface 112. In some embodiments, recording surface 112 is a blank surface that includes no position or timing information, such as previously written servo spirals, servo wedges, and the like.

In step 902, the controller receives a signal that is based on an electrical property of a material included in FPCB 123. In some embodiments, the signal indicates an electrical resistance of one or more strain-gauge members 533. In other embodiments, the signal indicates a capacitance of an electrical system that includes first conductive body 534 and second conductive body 535.

In step 903, the controller determines a radial position of the read/write head 127 relative to the recording surface 112 based on the signal received in step 902. In some embodiments, the controller determines the radial position of the read/write head 127 using a radial position lookup table and the signal received in step 902.

In step 904, the controller controls the radial velocity of the read/write head 127 based at least in part on the radial position determined in step 903. As read/write head 127 moves with a radial velocity relative to recording surface 112, the controller causes read/write head 127 to write timing and position information, such as a servo spiral, on recording surface 112.

In some embodiments, for purposes of controlling the radial velocity of the read/write head, the controller assumes that the radial position determined in step 903 is the current radial position of the read/write head 127. In some embodiments, the controller instead assumes that an average of multiple previous radial positions determined in step 903 is the current radial position of the read/write head 127. In some embodiments, the controller controls the radial position of the read/write head 127 using one or more conventional techniques, and includes the radial position determined in step 903 as additional position feedback for determining the current radial position of the read/write head 127. For example, in such embodiments, the controller may control the radial velocity of the read/write head 127 by applying a suitable open loop voltage or current profile to voice coil motor 128, where such a voltage or current profile is modified based on the radial position determined in step 903. Alternatively, in some embodiments, the controller may control the radial velocity of the read/write head 127 using velocity control based on back EMF feedback from voice coil motor 128, where such back EMF feedback is modified based on the radial position determined in step 903. In each case, the radial position feedback provided by method 900 can improve the radial placement accuracy of servo spirals written via method 900.

In step 905, the controller determines whether the servo spiral write is complete. If no, method 900 returns to step 902; if yes, method 900 proceeds to step 906 and terminates.

Implementation of method 900 enables more accurately positioned coarse guide spirals to be written on a blank disk by HDD 100. Specifically, because embodiments described herein provide position feedback that is not available in conventional approaches, a coarse guide spiral written via method 900 can have a mean position error relative to a corresponding ideal spiral trajectory that approaches zero. By contrast, a coarse guide spiral written via conventional approaches is generally subject to significant drift away from the corresponding ideal spiral trajectory. Therefore, such conventionally written coarse guide spirals usually have a significant mean position error relative to the ideal spiral trajectory, and consequently have the potential to cross or interfere with adjacent servo spirals.

In light of the above, in some embodiments, the more accurately positioned coarse guide spirals written via method 900 can reduce the time required for HDD 100 to complete writing servo wedges. For example, in some embodiments, using method 900, a larger number of initial coarse guide spirals can be written to a blank recording surface in a set, thereby reducing the number of spiral writing processes that are needed before writing servo wedges. Further, the more accurately positioned coarse guide spirals written via method 900 can greatly reduce the potential for rework or scrapping of an HDD due to inaccurately written coarse guide spirals.

While the foregoing is directed to embodiments of the present invention, other and further embodiments of the invention may be devised without departing from the basic scope thereof, and the scope thereof is determined by the claims that follow.

We claim:

1. A method of writing servo information in a disk drive that includes a magnetic head and a flexible printed circuit board (FPCB) coupled to an actuator for the magnetic head, the method comprising:
   receiving a signal based on an electrical property of a material included in the FPCB, wherein the electrical property of the material changes as the actuator moves;
   determining a radial position of the magnetic head relative to a disk of the disk drive based on the signal; and
   controlling a radial velocity of the magnetic head relative to the disk of the disk drive based on the radial position.

2. The method of claim 1, wherein determining the radial position of the magnetic head relative to the disk is further based on an estimated radial velocity of the magnetic head relative to the disk.

3. The method of claim 2, wherein the estimated radial velocity is based on a back electromotive force signal associated with the actuator.

4. The method of claim 1, wherein determining the radial position of the magnetic head relative to the disk based on the signal comprises selecting the radial position from a lookup table.

5. The method of claim 4, further comprising prior to receiving the signal, updating one or more values of the lookup table based on a calibration process performed by the drive.

6. The method of claim 4, wherein the lookup table comprises one or more generic values.

7. The method of claim 1, wherein the electrical characteristic of the material included in the FPCB comprises one of a resistance of the material and a capacitance of the material.

8. The method of claim 7, wherein the material is included in a strain gauge.

9. The method of claim 7, wherein the material is included in a first conductive body and a second conductive body that are included in a system having the capacitance of the material.

10. A disk drive comprising:
    a magnetic head;
    an actuator for the magnetic head;
    a flexible printed circuit board (FPCB) coupled to the actuator; and
    a controller configured to perform the steps of:
      receiving a signal based on an electrical property of a material included in the FPCB, wherein the electrical property of the material changes as the actuator moves;
      determining a radial position of the magnetic head relative to a disk of the disk drive based on the signal; and
      controlling a radial velocity of the magnetic head relative to the disk of the disk drive based on the radial position.

11. The disk drive of claim 10, wherein determining the radial position of the magnetic head relative to the disk is further based on an estimated radial velocity of the magnetic head relative to the disk.

12. The disk drive of claim 11, wherein the estimated radial velocity is based on a back electromotive force signal associated with the actuator.

13. The disk drive of claim 10, wherein determining the radial position of the magnetic head relative to the disk based on the signal comprises selecting the radial position from a lookup table.

14. The disk drive of claim 13, further comprising prior to receiving the signal, updating one or more values of the lookup table based on a calibration process performed by the drive.

15. The disk drive of claim 13, wherein the lookup table comprises one or more generic values.

16. The disk drive of claim 10, wherein the electrical characteristic of the material included in the FPCB comprises one of a resistance of the material and a capacitance of the material.

17. The disk drive of claim 16, wherein the material is included in a strain gauge.

18. The disk drive of claim 17, wherein the strain gauge is formed within the FPCB.

19. The disk drive of claim 16, wherein the material is included in a first conductive body and a second conductive body that are included in a system having the capacitance of the material.

20. The disk drive of claim 19, wherein the first conductive body is formed within or on a surface of the FPCB and the second capacitive body is formed within or on the surface of the FPCB.

* * * * *